(12) United States Patent
Valderrama

(10) Patent No.: US 12,496,054 B2
(45) Date of Patent: Dec. 16, 2025

(54) INTRACORPOREAL RETRACTING SUTURE

(71) Applicant: Alexander Ramirez Valderrama, St. Petersburg, FL (US)

(72) Inventor: Alexander Ramirez Valderrama, St. Petersburg, FL (US)

( * ) Notice: Subject to any disclaimer, the term of this patent is extended or adjusted under 35 U.S.C. 154(b) by 332 days.

(21) Appl. No.: 18/193,106

(22) Filed: Mar. 30, 2023

(65) Prior Publication Data

US 2024/0325013 A1    Oct. 3, 2024

(51) Int. Cl.
*A61B 17/02* (2006.01)
*A61B 17/06* (2006.01)
*A61M 27/00* (2006.01)

(52) U.S. Cl.
CPC .. *A61B 17/0218* (2013.01); *A61B 2017/0225* (2013.01); *A61B 2017/0608* (2013.01); *A61B 2017/06176* (2013.01); *A61M 27/00* (2013.01)

(58) Field of Classification Search
CPC ....... A61B 17/2018; A61B 2017/0225; A61M 27/00
USPC .................................................. 600/201–245
See application file for complete search history.

(56) References Cited

U.S. PATENT DOCUMENTS

| | | | | |
|---|---|---|---|---|
| 5,649,961 | A | * | 7/1997 | McGregor ............... B21G 1/00 606/222 |
| 7,871,425 | B2 | | 1/2011 | Jones et al. |
| 9,011,487 | B2 | | 4/2015 | Lindh et al. |
| 2005/0096698 | A1 | | 5/2005 | Lederman |
| 2010/0081883 | A1 | * | 4/2010 | Murray ............ A61B 17/00234 600/204 |
| 2010/0174299 | A1 | * | 7/2010 | Viola .................... A61F 5/0083 606/228 |
| 2010/0298629 | A1 | * | 11/2010 | Huang ............... A61B 17/0401 600/37 |
| 2018/0116648 | A1 | | 5/2018 | Kim | |

* cited by examiner

*Primary Examiner* — Eduardo C Robert
*Assistant Examiner* — Tara Rose E Carter

(57) ABSTRACT

The intracorporeal suture device is intended to provide users with a medical device that may be used to retract intraabdominal organs and tissue for better exposure during minimally invasive procedures (laparoscopic and robotic surgical procedures). More specifically, the device allows for retraction without the need for needle extraction through the abdominal wall, thereby avoiding risk for infection, contamination, bleeding and iatrogenic vessels or nerves injuries. Accordingly, the single device includes differently shaped needle structures integrated onto a barbed suture that allows for safe and reliable retraction of organs during MIS procedures. Further, the device includes a flat area for easy handling of needles during intracorporeal manipulation avoiding the needs of a needle holder. Furthermore, the device includes additional drainage structures that helps with retraction of larger organs as well as collection of fluids during the procedures.

11 Claims, 8 Drawing Sheets

INTRACORPOREAL RETRACTING SUTURE

FIELD OF THE INVENTION

The present invention generally relates to a suture device. More specifically, the present invention relates to a device designed to provide an easier and quicker way of achieving a good degree of retraction during minimally invasive surgery.

BACKGROUND OF THE INVENTION

Laparoscopic surgical techniques offer many benefits, including minimizing incision size and trauma, reducing postoperative discomfort, shortening recovery rates, and reducing incidence of postoperative wound infections. Consequently, laparoscopic techniques are increasingly used to improve patient outcomes, being widely applied to cholecystectomy, sleeve gastrectomy, gastric bypass, hernia repair, Nissen fundoplication, gastrectomy, colectomy, small intestine resection and more. A device that provides good retention of sutures is in demand, because the use of laparoscopic surgery has increased apace since its development as a method for reducing the incised portion of skin.

In a laparoscopic surgery, multiple small holes are made at a patient's abdomen with trocars, through which medical tools such as an endoscope or sutures can be introduced to the operating site. To minimize the likelihood of complications, including pain, bleeding, and infection, and to improve cosmesis for the patient while ensuring the safety and feasibility of the surgical procedure, doctors are always looking for new ways of decreasing the number of trocars used in laparoscopic surgery.

Multiple trocars may be required in certain surgical operations. Further, tying knots during the suturing process, so as to prevent the release of a suture thread, can be time-consuming and frustrating, but is highly important work that greatly affects the results of surgery.

Many devices have been developed to facilitate suturing and knotting while reducing trocar-related issues. However, such devices are generally expensive and difficult to use and require a large installation space if they are to achieve good retraction of sutures during minimally invasive surgical procedures. Accordingly, a device is needed that solves the above-mentioned problems.

The present invention is intended to address problems associated with and/or otherwise improve on conventional devices through an innovative suture device that is less expensive and that is designed to provide a convenient means for retracting suture during surgical operations while incorporating other problem-solving features. More specifically, the present invention is an intracorporeal device that allows for retraction without the need for needle extraction through the abdominal wall, thereby avoiding risk for infection, contamination, bleeding and iatrogenic vessels or nerves injuries.

SUMMARY

The present invention is intended to provide users with a medical device that may be used to retract intraabdominal organs and tissue for better exposure during minimally invasive procedures (laparoscopic and robotic surgical procedures). To accomplish this, the present invention is designed with unique aspects to make it work in a simple and quick way to perform retraction during MIS procedures. More specifically, the present invention is an intracorporeal device that allows for retraction without the need for needle extraction through the abdominal wall, thereby avoiding risk for infection, contamination, bleeding and iatrogenic vessels or nerves injuries. Accordingly, the present invention is a single device that comprises differently shaped needle structures integrated onto a barbed suture that allows for safe and reliable retraction of organs during MIS procedures. Further, the present invention comprises a flat area for easy handling of needles during intracorporeal manipulation avoiding the needs of a needle holder. Furthermore, the present invention comprises additional drainage structures that helps with retraction of larger organs as well as collection of fluids during the procedures.

DETAILED DESCRIPTION OF THE INVENTION

Figure 1:
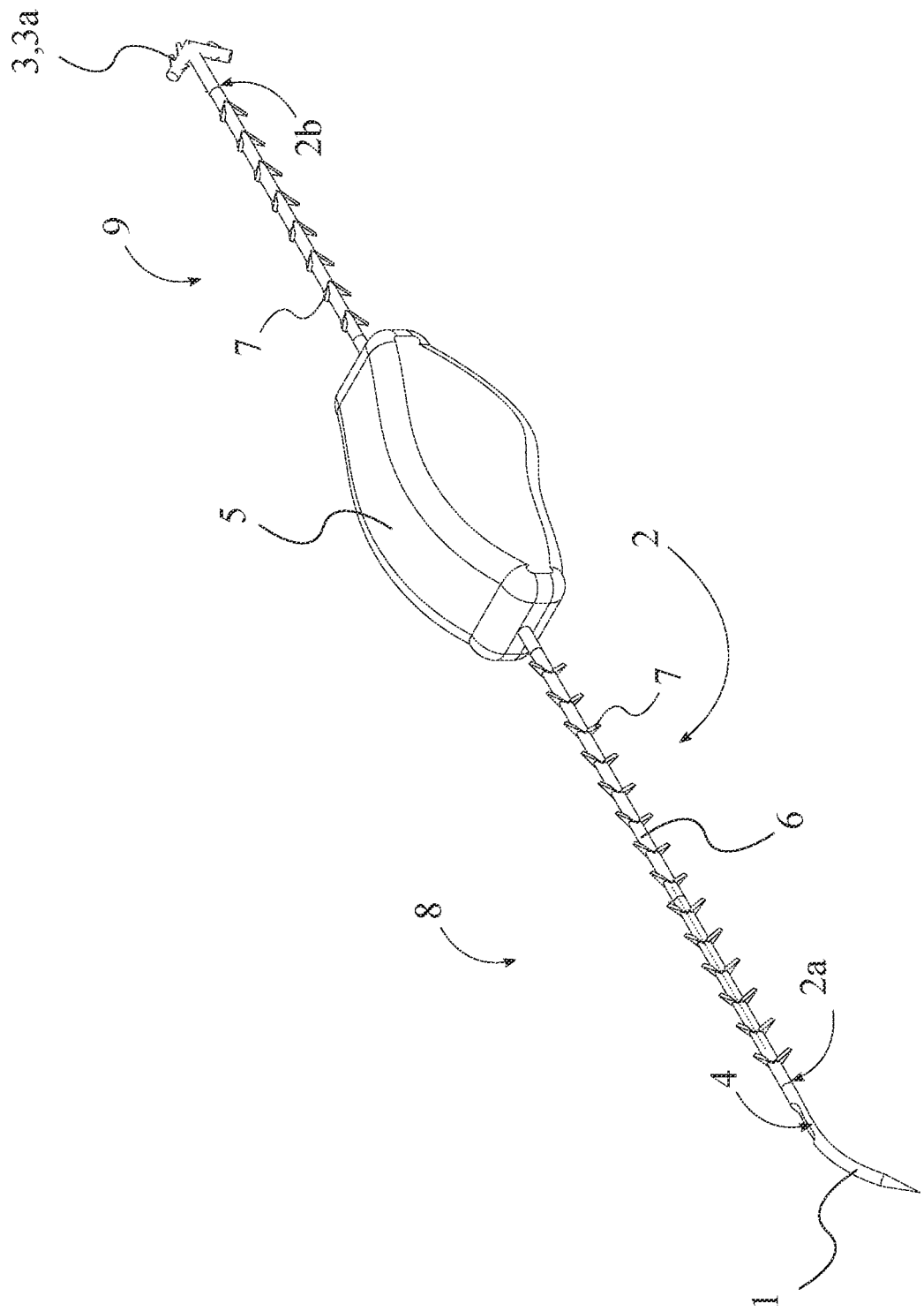
FIG. 1 is a top front left perspective view of the present invention, wherein a drainage device is connected centrally along a barbed suture.
Figure 2:
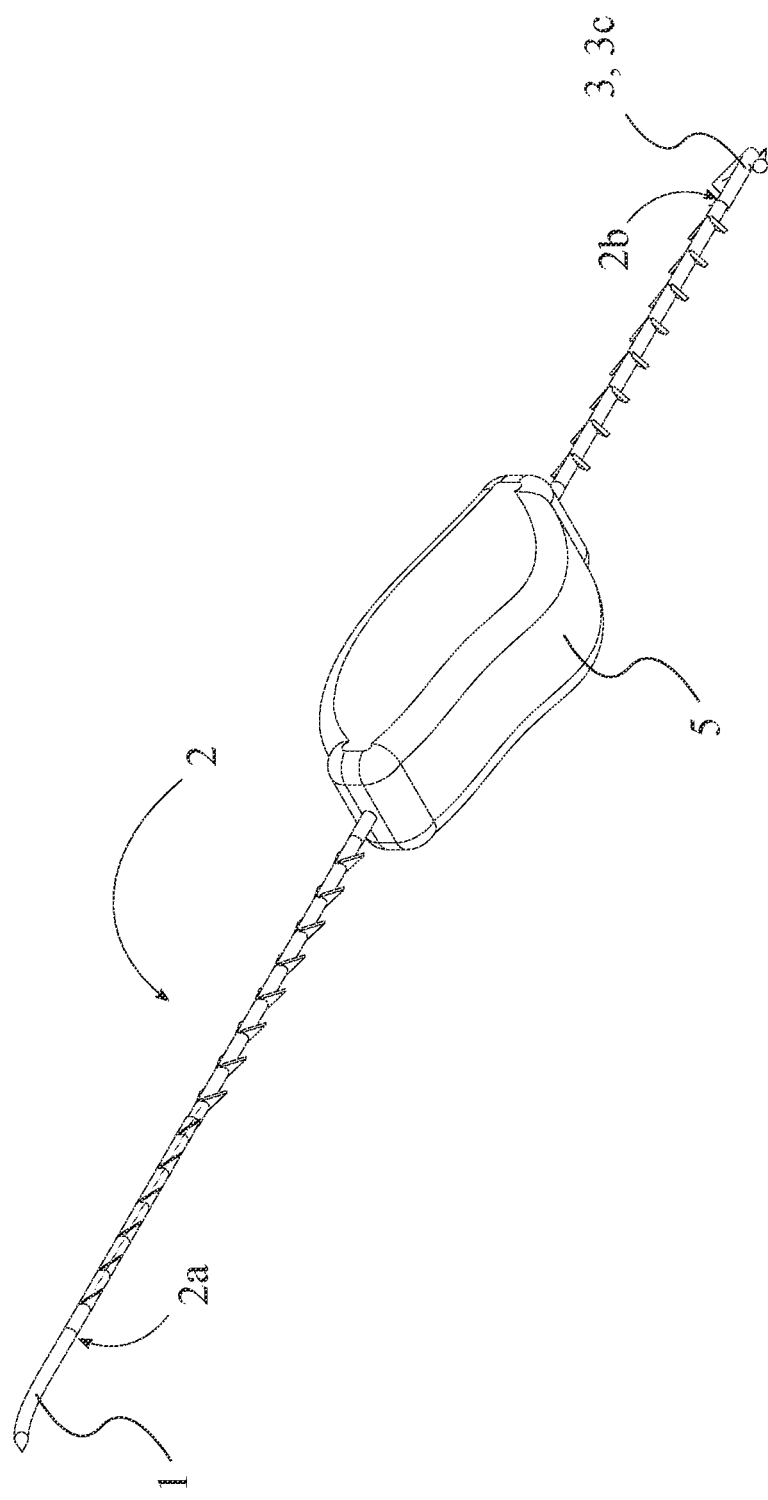
FIG. 2 is a bottom rear left perspective view of the present invention, wherein a second terminal end of the device is an arrow structure.
Figure 3:
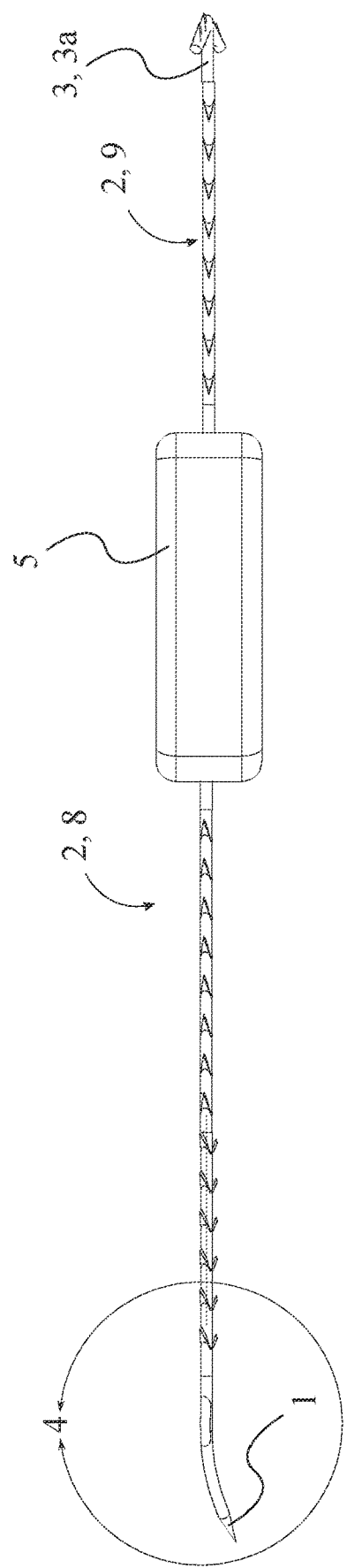
FIG. 3 is a top plan view of the present invention.
Figure 4:
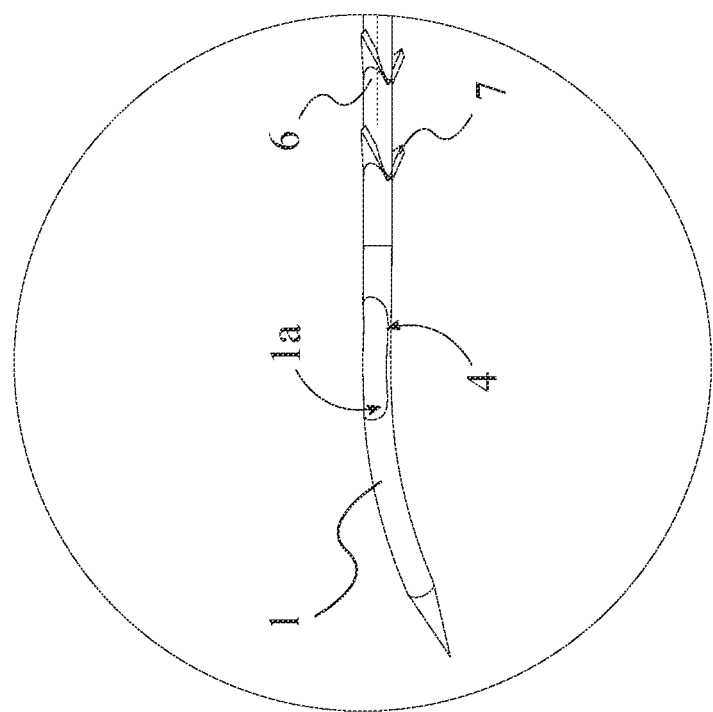
FIG. 4 is a detailed view of section 4 of FIG. 3.
Figure 5:
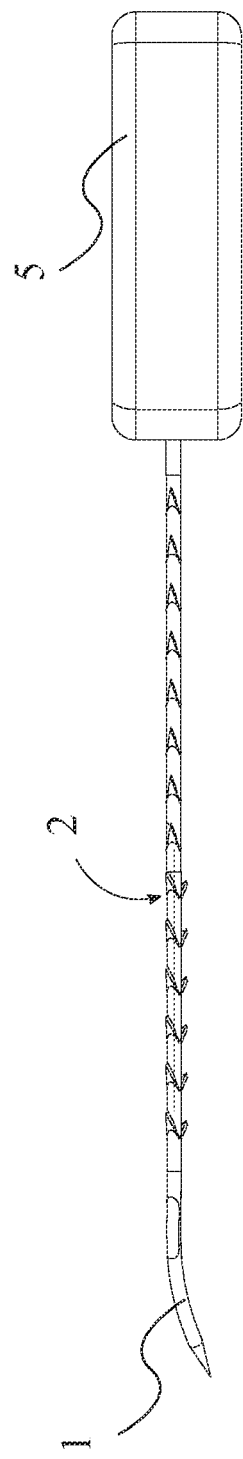
FIG. 5 is a top plan view of the present invention, wherein the drainage device is positioned at a terminal end of the barbed suture.

All illustrations of the drawings are for the purpose of describing selected versions of the present invention and are not intended to limit the scope of the present invention. In reference to FIG. 1 through FIG. 7, the present invention is an intracorporeal suture device. The present invention is intended to provide users with a medical device that may be used to retract intraabdominal organs and tissue for better exposure during minimally invasive procedures (laparoscopic and robotic surgical procedures). To accomplish this, the present invention is designed with unique aspects to make it work in a simple and quick way to perform retraction during MIS (minimally invasive surgery) procedures. More specifically, the present invention is an intracorporeal device that allows for retraction without the need for needle extraction through the abdominal wall, thereby avoiding risk for infection, contamination, bleeding and iatrogenic vessels or nerves injuries. Accordingly, the present invention is a single device that comprises differently shaped needle structures integrated onto a barbed suture that allows for safe and reliable retraction of organs during MIS procedures. Further, the present invention comprises a flat area for easy handling of needles during intracorporeal manipulation avoiding the needs of a needle holder. Furthermore, the present invention comprises additional drainage structures that helps with retraction of larger organs as well as collection of fluids during the procedures.

The following description is in reference to FIG. 1 through FIG. 8. According to a preferred embodiment, the present invention comprises a first hook device 1, a barbed suture 2, a second hook device 3, a needle zone 4, and a drainage device 5. As seen in FIG. 1 through FIG. 3 and FIG. 6 through FIG. 8, the first hook device 1 is connected to a first terminal end 2a of the barbed suture 2, and the second hook device 3 is connected to a second terminal end 2b of the barbed suture 2, wherein the first terminal end 2a is positioned opposite to the second terminal end 2b across a length 2c of the barbed suture 2. Preferably, the first hook device 1 is a half-curved needle (a.k.a. a "ski" needle) with a tapered tip and the barbed suture 2 is a polydioxanone (PDS) barbed suture. This is so that, the first hook device 1 or ski needle may be attached to the PDS barbed suture 2 to provide auto retention in the abdominal cavity after being attached to the peritoneal surface and with an arrow end to hold it into the tissue or organ allowing a safe and reliable retraction during MIS procedures. Further, the needle zone 4 is integrated onto the first hook device 1, wherein the needle zone 4 is positioned adjacent to the barbed suture 2. The needle zone 4 can include a flat area for easy handling during intracorporeal manipulation, avoiding the need for a needle holder. In other words, the needle zone 4 is at least one indentation along a first surface 1a of the first hook device 1. In the preferred embodiment, the needle zone 4 is a flat indentation along the first surface 1a of the first hook device 1. The flat area may allow the needle to be used with a regular laparoscopy Maryland dissector while ensuring that it can be easily passed through a 5-mm trocar. However, the first hook device 1 and the needle zone 4 may comprise any other size, shape, location, orientation etc., as long as the intents of the present invention are not altered.

Further, for retraction of big and heavy organs as the liver, spleen or uterus the present invention comprises the drainage device 5, which is integrated along the length 2c of the barbed suture 2. Preferably, the drainage device 5 is a small interposition of a soft, flexible rubber tape, such as a Penrose drain attached to the barbed suture 2. However, the drainage device 5 may comprise any other size, shape, material, components, arrangement of components etc. that tare known to one of ordinary skill in the art, as long as the objectives of the present invention are not altered.

According to the preferred embodiment, the barbed suture 2 comprises a thread 6 and a plurality of arrows 7. The thread 6 can be of a suitable length extending between the first terminal end 2a and the second terminal end 2b. Preferably, the plurality of arrows 7 is distributed along a length of the thread 6, and the plurality of arrows 7 extends away from the thread 6. More specifically, in the preferred embodiment, the barbed suture 2 comprises a first section 8 and a second section 9. In reference to FIG. 1 through FIG. 3, FIG. 7 and FIG. 8, the first section 8 is positioned between the first hook device 1 and the drainage device 5, and the second section 9 is positioned between the second hook device 3 and the drainage device 5. The plurality of arrows 7 may be disposed on the surface of the thread 6 in a direction away from the hook device that is attached at the terminal end of the thread 6. For example, the plurality of arrows 7 adjacent to the first hook device 1 are oriented away from the first hook device 1, whereas the plurality of arrows 7 adjacent to the second hook device 3 may orient away from the second hook device 3. In other words, a plurality of first arrows 7a from the first section 8 is oriented away from the first hook device 1, and a plurality of second arrows 7b from the second section 9 is oriented away from the second hook device 3. The direction of the plurality of arrows 7 may enable insertion of one end of the barbed suture 2 in the tissue of a patient in only one direction. Before and during insertion of one end of the barbed suture 2 in the tissue of a patient, the first hook device 1 may be removably attached to the second hook device 3.

In the preferred embodiment, and as seen in FIG. 1 through FIG. 3, FIG. 6 and FIG. 7, the second hook device 3 is an arrow structure 3a. Preferably, the arrow structure 3a is made of the same material as the barbed suture 2 (such as PDS), but with barbs in a direction opposite to that of the barbed suture 2. The arrow structure 3a at the second terminal end 2b of the barbed suture 2 can hold the barbed suture 2 into the tissue or organ and thus may allow safe and reliable retraction during MIS procedures. Users can simply attach the needle to the peritoneal surface, so that the barbed suture 2 connected to the needle provides auto-retention of the arrow structure 3a in the abdominal cavity without need to pass it through the abdominal wall to get retraction. In alternate embodiments, the second hook device 3 is a curved needle 3b or a circular needle with a suitable curvature, based on the procedure involved.

In reference to FIG. 1 through FIG. 3, FIG. 7 and FIG. 8 the drainage device 5 is centrally positioned along the length 2c of the barbed suture 2. In reference to FIG. 5, the drainage device 5 is connected to a terminal end of the barbed suture 2. More specifically, in this embodiment, there is no second hook device 3, and the drainage device 5 is connected to the second terminal end 2b of the barbed suture 2. Further, in this embodiment, the plurality of arrows 7 may orient in any direction along the thread 6 of the barbed suture 2, as long as the objectives of the present invention are fulfilled.

Figure 6:
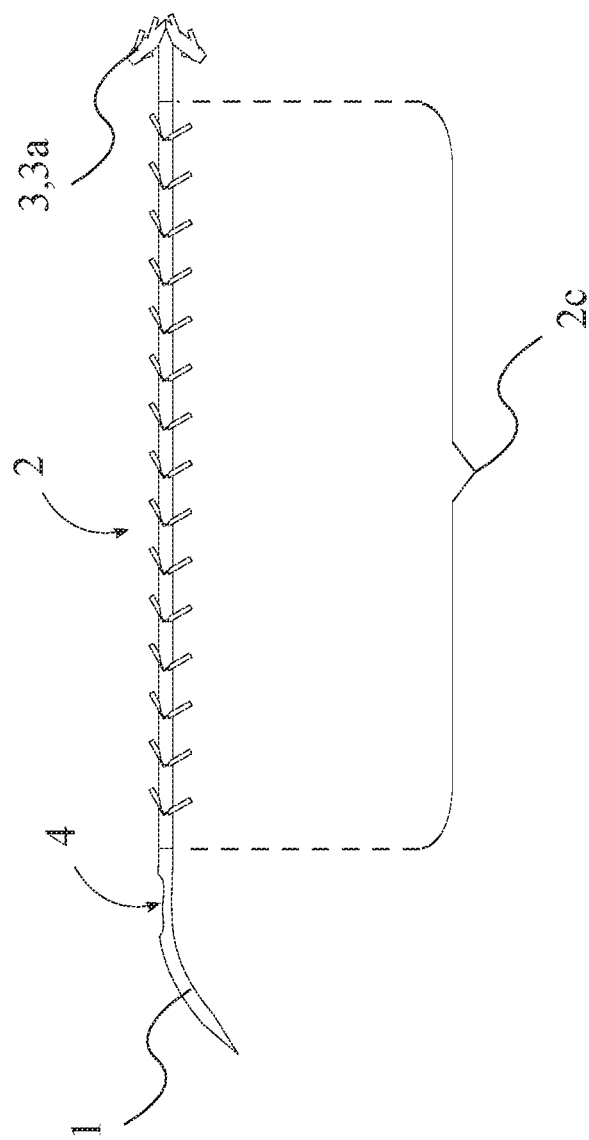
FIG. 6 is a front perspective view of the present invention, without a drainage device.

It is preferred that the first hook device 1, the second hook device 3, and the drainage device 5 are capable of passing through a 5 mm port. A more detailed description of how the present invention may be used during a medical procedure, along with different examples follows:

In a first embodiment, and as seen in FIG. 6, the present invention does not have a drainage device 5 or Penrose drain. In this embodiment, the suture device can be used in laparoscopic cholecystectomy as follows: The user can pass the suture device through a trocar port to the abdominal cavity under direct visualization using a 5-mm grasper and then, using the Maryland grasper, grasp the needle (first hook device 1) of the suture device over the flat area, placing a stitch through the fundus of the gallbladder and pulling it all the way out, until the arrow end is attached to the gallbladder for traction, and then pulling the fundus over the liver dome, offering good exposure of the cystic duct and cystic artery. After choosing where to place the stitch for optimal retraction, the user employs the same technique, using the Maryland grasper to place the stitch over the parietal peritoneum, allowing about a 1-cm length to pass under the peritoneum. The user then continues pulling over the arrow structure 3a to keep the gallbladder fundus attached to the parietal peritoneum and obtain good traction, offering ideal exposure of the structures of Calot's triangle. At this point, the user places the needle in a secure area over the liver; after completion of the cholecystectomy procedure, the arrow structure 3c is cut and the whole suture device removed through a 5-mm port under direct visualization. This is an example for gallbladder retraction during laparoscopic cholecystectomy, completing the procedure safely with excellent exposure without needing to place an additional trocar, thereby decreasing the possibility of wound complications, avoiding pain, and promoting cosmesis while avoiding the need for a surgical assistant to provide gallbladder traction. In much the same way, the suture device can be used to retract any intra-abdominal organ, whether the omentum, stomach, small bowel, colon, mesentery, ovaries, fallopian tubes, uterus, or more. Using the suture device, such a technique can be used similarly in all robotic cases.

Figure 7:
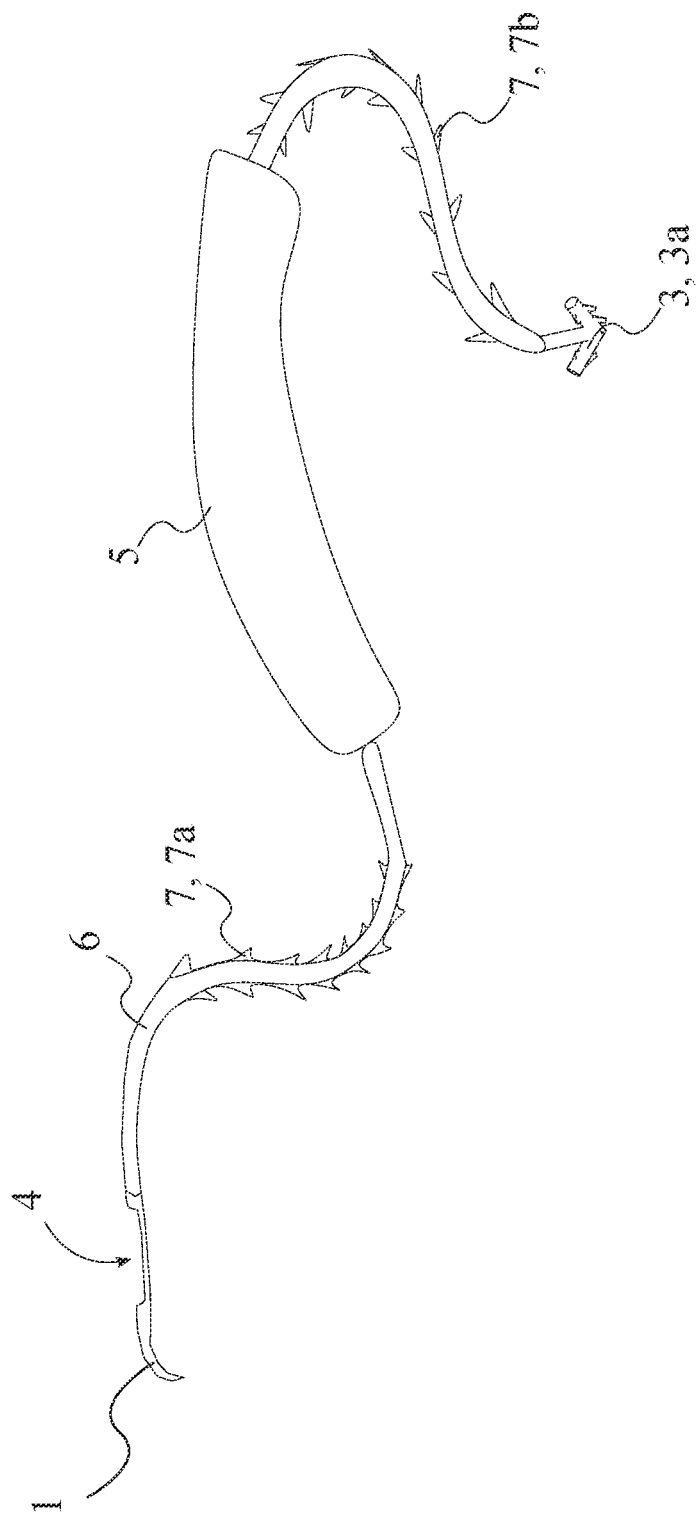
FIG. 7 is a perspective view of the present invention used for regular organ MIS procedures.

In a second embodiment, the suture device may include the tape (e.g., a Penrose drain-drainage device 5) attached to the barbed suture 2 with one ski needle (1), as shown in FIG. 7, and such suture device can be used for hiatal hernia repair as follows: The barbed suture 2 is passed through one trocar port to the abdominal cavity under direct visualization using a 5-mm grasper, the Penrose end is passed behind the esophagus and pulled out until the Penrose is completed around the esophagus, and then the ski needle is used to put a stitch over the end of the Penrose, creating traction and retracting the esophagus toward the anterior abdominal wall to offer good exposure of the hiatus area and prepare it for closure. At this point the user chooses where to place the stitch for optimal retraction, then uses the ski needle in the other end of the Penrose to place a stitch over the parietal peritoneum, over the previously chosen area in the anterior abdominal wall, passing about a 1-cm length under the peritoneum. The user then continues pulling the stitch over the arrow structure 3a to keep the suture device attached to the parietal peritoneum and create traction of the esophagus, offering ideal exposure of the structures of the hiatal area. At this point, the user places the needle in a secure area over the abdominal wall. After completion of the procedure, the arrow structure 3a is cut and the whole suture device is removed through the trocar port under direct visualization.

Figure 8:
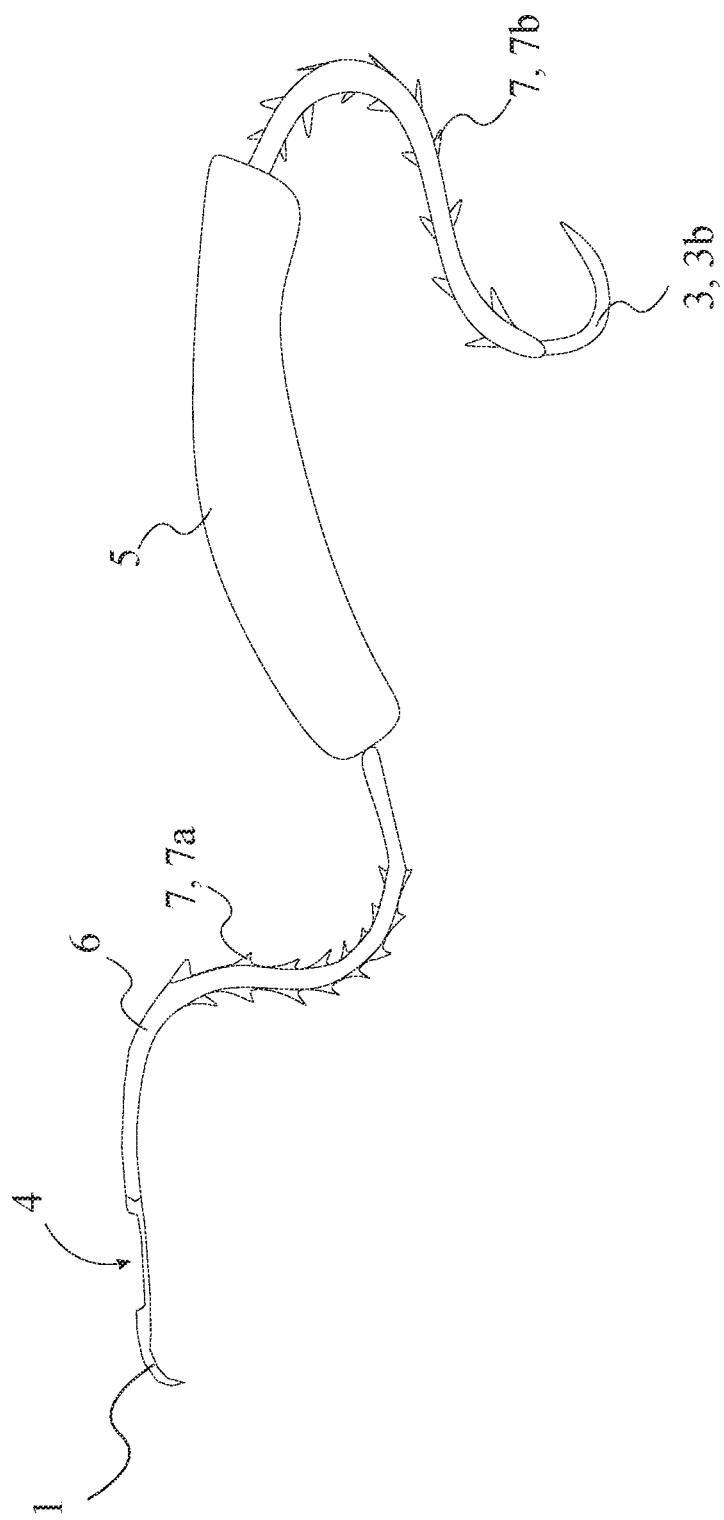
FIG. 8 is a perspective view of the present invention used for heavy organ MIS procedures.

In one embodiment, the suture device may include two arrow sutures attached together with the tape (e.g., a Penrose drain) in the middle and one ski needle in one end and a curved needle in the other opposite end, as shown in FIG. 8. Such suture device can be used in laparoscopic Bariatric Surgery or Hiatal hernia repair as follows: The barbed suture 2 is passed through one trocar port to the abdominal cavity under direct visualization using a 5 mm grasper, the left lobe of the liver is retracted cephalad with a grasper, then after identification of the hiatus, one stitch is placed on the right hiatus side using the curve tapped needle, the barbed suture is pulled out until the Penrose got attached to the right hiatus area, then using the Penrose over the left liver lobe a gentle traction is performed toward the end of the Falciform ligament until the user gets an optimal exposure of the gastroesophageal junction, then at this point, the user identifies where the user will place the stitch for optimal retraction, then using the ski needle in the other end of the Penrose, a stitch is placed over the parietal peritoneum, over the previous chosen area above Falciform ligament, allowing to pass about 1 cm in length under the peritoneum, then the user continues with pulling over the arrow suture to keep the Penrose attached to the parietal peritoneum, obtaining a good traction of the left lobe of the liver for ideal exposure of the structures of the hiatal area. At this point, the users place both needles in a secure area over the liver. After completion of the procedure, the arrow suture is cut and the whole suture device is removed through a port under direct visualization.

Although the invention has been explained in relation to its preferred embodiment, it is to be understood that many other possible modifications and variations can be made without departing from the spirit and scope of the invention as hereinafter claimed.

What is claimed is:

1. An intracorporeal retraction suture device comprising:
   a first hook device;
   a barbed suture;
   a second hook device;
   a drainage device;
   the first hook device comprising a needle zone;
   the first hook device being connected to a first terminal end of the barbed suture;
   the second hook device being connected to a second terminal end of the barbed suture;
   the needle zone being integrated onto the first hook device;
   the needle zone being positioned adjacent to the barbed suture;
   the needle zone being a flat indentation along a first surface of the first hook device;
   the first hook device being a half-curved needle with a tapered tip;
   the second hook device being an arrow structure; and
   the drainage device being integrated along a length of the barbed suture.

2. The intracorporeal retraction suture device of claim 1, the barbed suture comprising:
   a thread and a plurality of arrows;
   the plurality of arrows being distributed along a length of the thread; and
   the plurality of arrows extending away from the thread.

3. The intracorporeal retraction suture device of claim 1, the barbed suture comprising:
   a first section and a second section;
   the first section being positioned between the first hook device and the drainage device; and
   the second section being positioned between the second hook device and the drainage device.

4. The intracorporeal retraction suture device of claim 3, comprising:
   a plurality of first arrows from the first section being oriented away from the first hook device; and
   a plurality of second arrows from the second section being oriented away from the second hook device.

5. The intracorporeal retraction suture device of claim 1, wherein the drainage device is centrally positioned along a length of the barbed suture.

6. The intracorporeal retraction suture device of claim 1, wherein the drainage device is connected to a terminal end of the barbed suture.

7. The intracorporeal retraction suture device of claim 1, wherein the drainage device is a Penrose drain.

8. The intracorporeal retraction suture device of claim 1, wherein the first hook device, the second hook device, and the drainage device are capable of passing through a 5 mm port.

9. An intracorporeal retraction suture device comprising:
   a first hook device;
   a barbed suture;
   a second hook device;
   a drainage device;
   the first hook device comprising a needle zone;
   the first hook device being connected to a first terminal end of the barbed suture;
   the second hook device being connected to a second terminal end of the barbed suture;
   the needle zone being integrated onto the first hook device;
   the needle zone being positioned adjacent to the barbed suture;
   the needle zone being a flat indentation along a first surface of the first hook device;
   the first hook device being a half-curved needle with a tapered tip;
   the second hook device being a curved needle; and the drainage device being integrated along a length of the barbed suture.

10. The intracorporeal retraction suture device of claim 9, the barbed suture comprising:
    a thread and a plurality of arrows;
    a first section and a second section;
    the plurality of arrows being distributed along a length of the thread;
    the plurality of arrows extending away from the thread;
    the first section being positioned between the first hook device and the drainage device; and
    the second section being positioned between the second hook device and the drainage device.

11. The intracorporeal retraction suture device of claim 10, comprising:
    a plurality of first arrows from the first section being oriented away from the first hook device; and
    a plurality of second arrows from the second section being oriented away from the second hook device.

* * * * *